B. ADRIANCE & A. CALLESON.
CLUTCH MECHANISM FOR DRAWING PRESSES AND THE LIKE.
APPLICATION FILED JUNE 25, 1908.
984,253.
Patented Feb. 14, 1911.
4 SHEETS—SHEET 1.
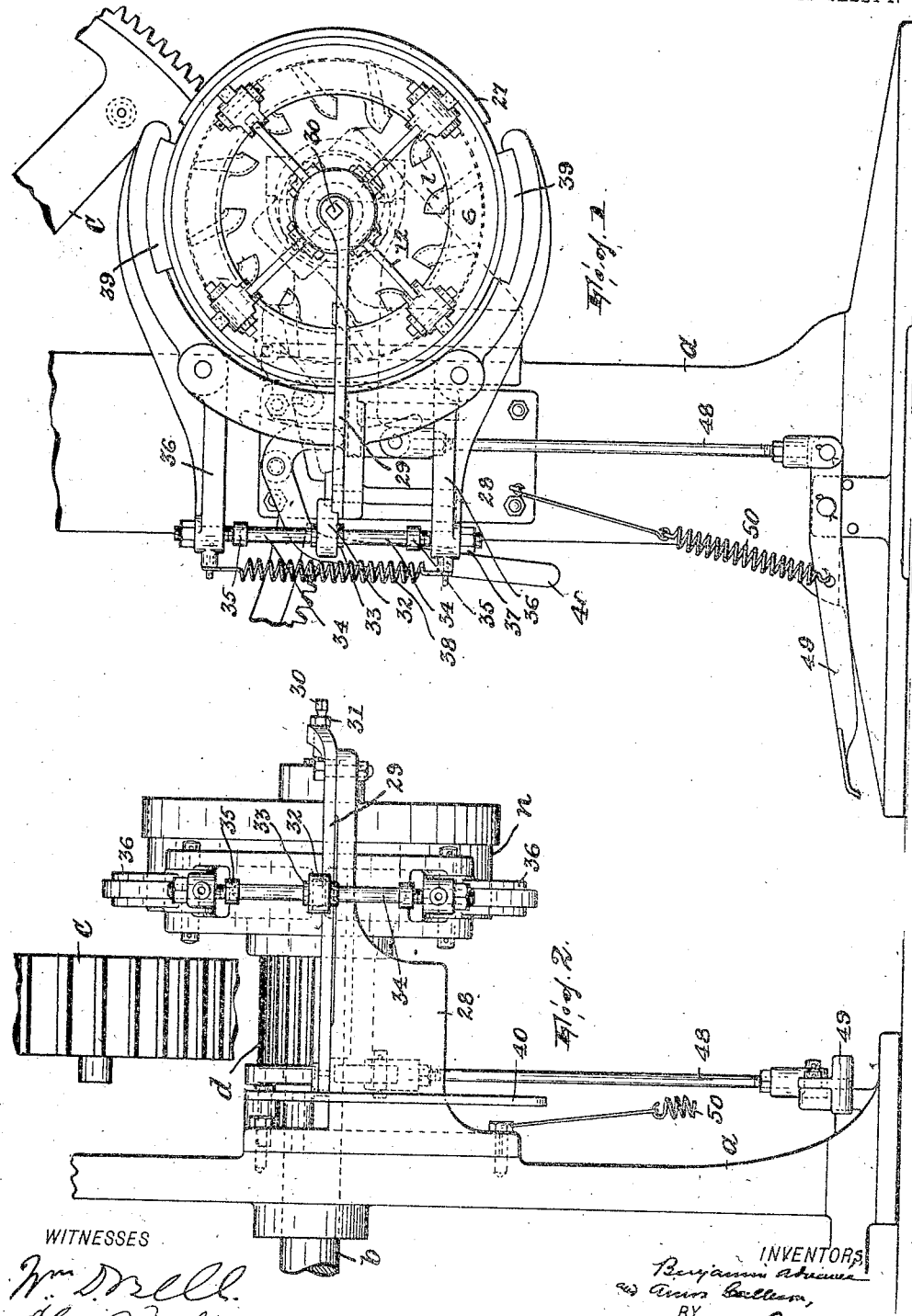

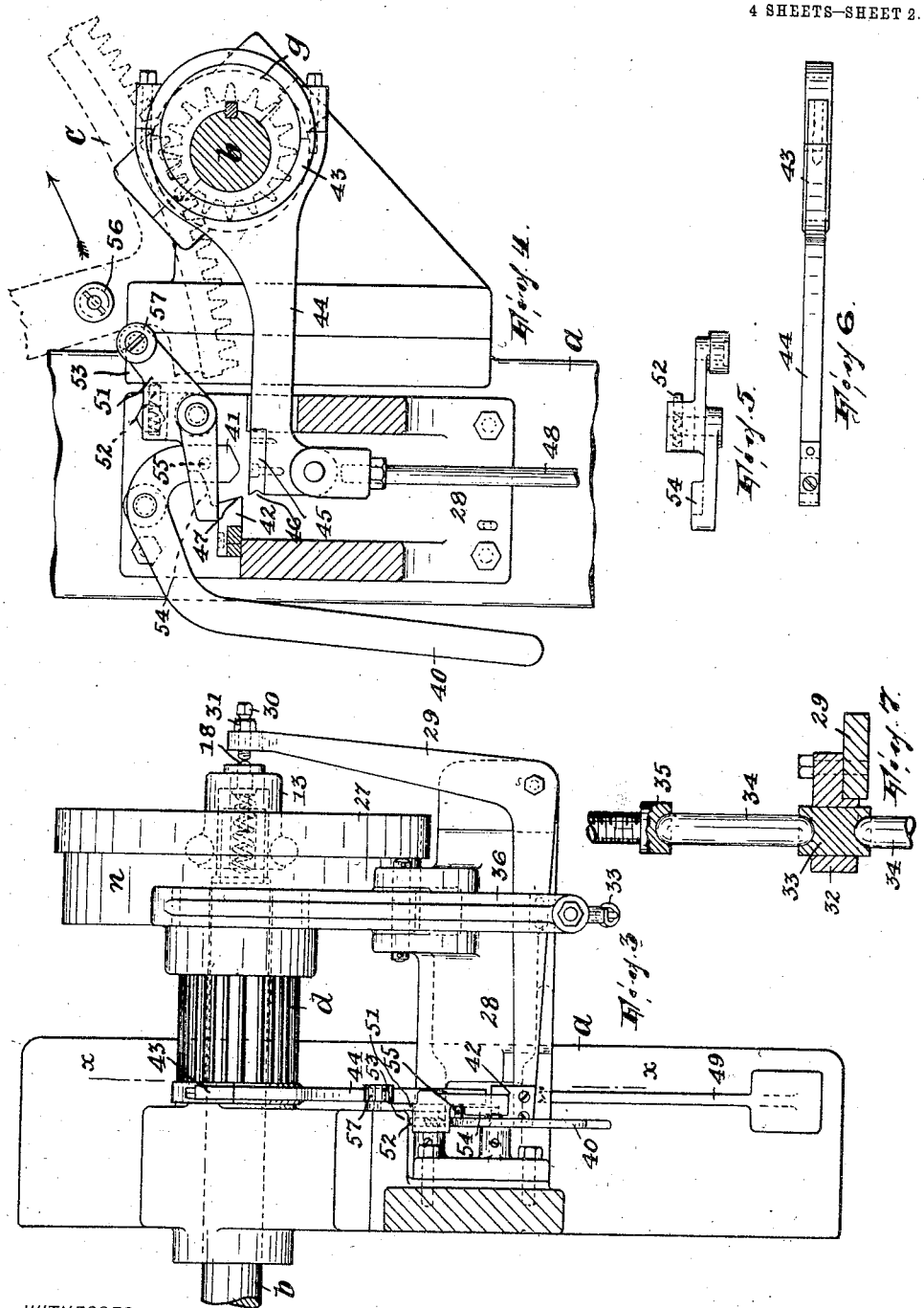

B. ADRIANCE & A. CALLESON.
CLUTCH MECHANISM FOR DRAWING PRESSES AND THE LIKE.
APPLICATION FILED JUNE 25, 1908.
984,253.
Patented Feb. 14, 1911.
4 SHEETS—SHEET 3.
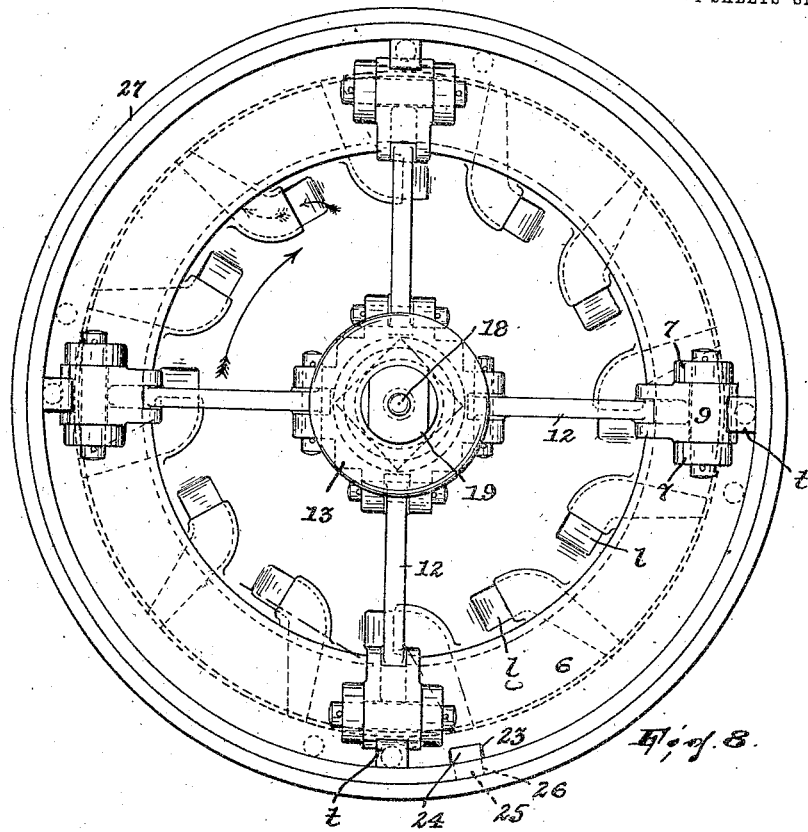
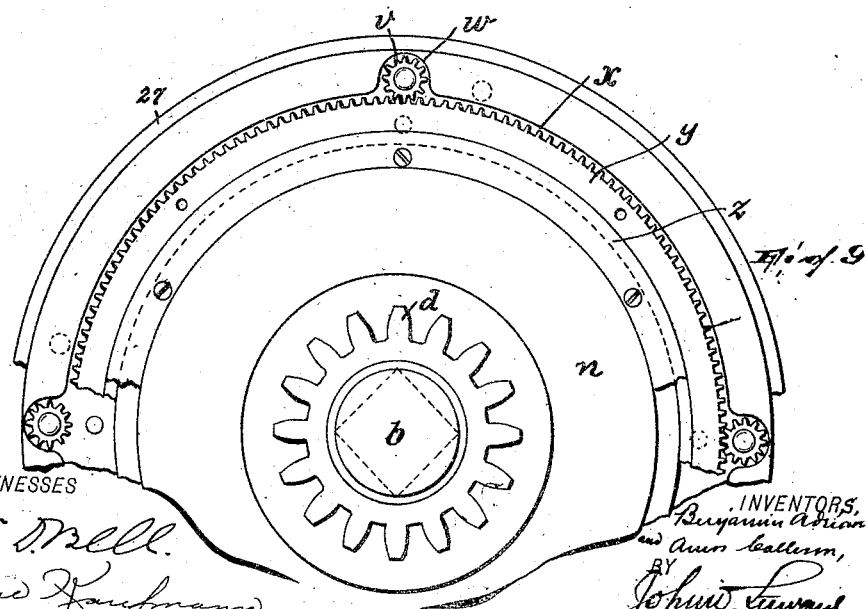
WITNESSES
INVENTORS
ATTORNEYS.

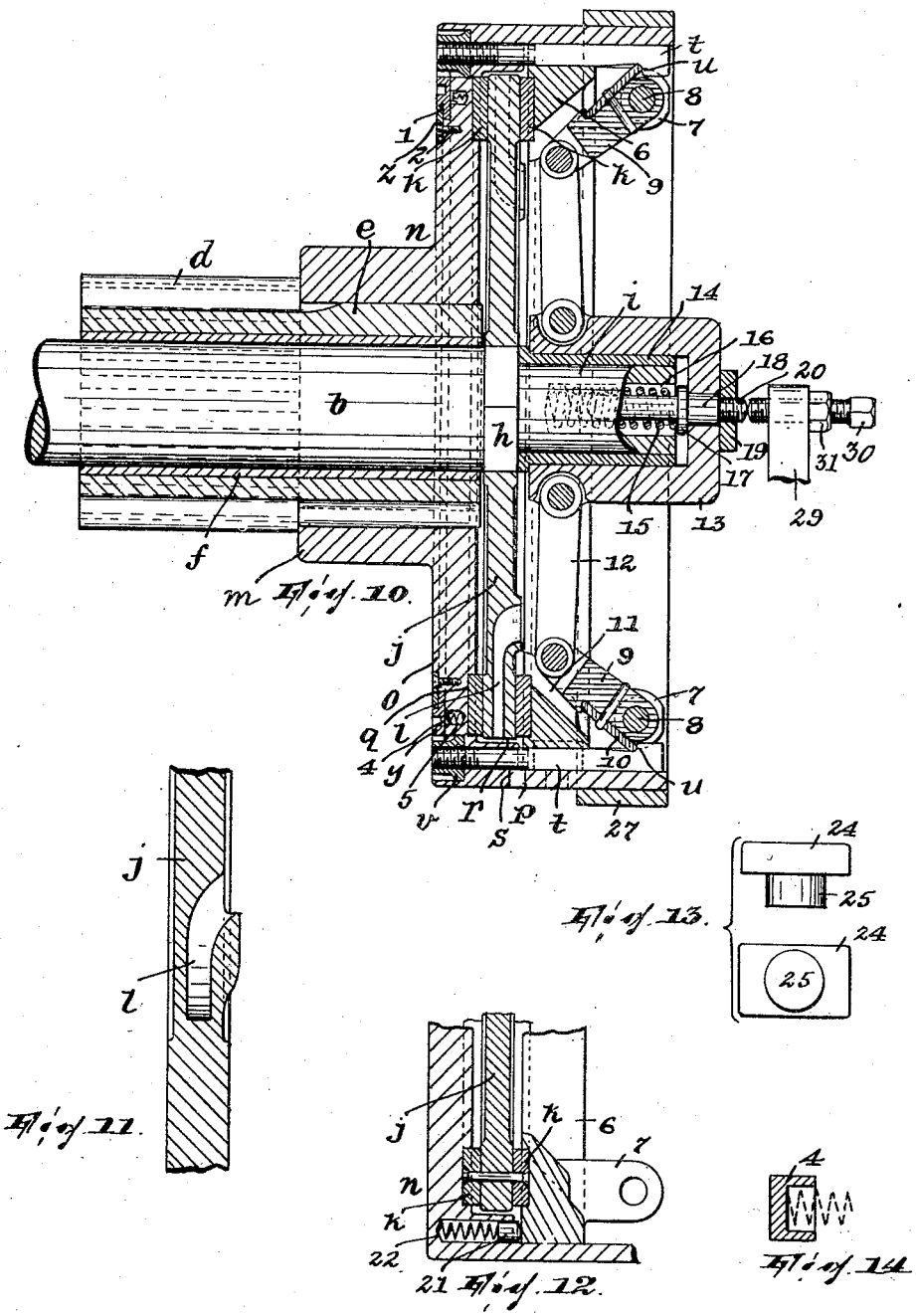

UNITED STATES PATENT OFFICE.

BENJAMIN ADRIANCE AND AMOS CALLESON, OF BROOKLYN, NEW YORK; SAID
CALLESON ASSIGNOR TO SAID ADRIANCE.

CLUTCH MECHANISM FOR DRAWING-PRESSES AND THE LIKE.

984,253.

Specification of Letters Patent.  Patented Feb. 14, 1911.

Application filed June 25, 1908. Serial No. 440,313.

*To all whom it may concern:*

Be it known that we, BENJAMIN ADRIANCE and AMOS CALLESON, citizens of the United States, residing in Brooklyn, county of Kings, State of New York, have invented certain new and useful Improvements in Clutch Mechanisms for Drawing-Presses and the Like; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to means for controlling the operation of parts requiring considerable power to overcome inertia and set them in motion and to overcome momentum and bring them to a standstill, as, for instance, the plunger and accessory mechanism of machines of the character of drawing presses and the like, where more or less frequent starting and stopping are incident to their operation.

The invention consists in a novel clutch mechanism for effecting an establishment and disestablishment of connection between a driving shaft or the like and the organism required to be set moving intermittently, and a novel means for controlling the clutch mechanism.

Our invention will be found fully illustrated in the accompaniyng drawings, wherein, Figure 1 is a view in side elevation of a drawing press provided with our improved controlling means; Fig. 2 is a front view of so much of the drawing press as comprises said mechanism, a certain spring being removed; Fig. 3 is a plan view of said mechanism; Fig. 4 a vertical sectional view on the line x—x of Fig. 3; Figs. 5, 6 and 7 illustrate details; Fig. 8 is an enlarged side view of the clutch, viewing the same from the same standpoint as it appears in Fig. 1; Fig. 9 is a side view of said clutch, on the same scale as Fig. 8, viewing the same from the opposite side of the machine as it appears in Fig. 1; Fig. 10 is a sectional view, taken substantially axially of the clutch; and, Figs. 11, 12, 13 and 14 are views illustrating details of said clutch.

The frame of the machine (only a part of which is shown in the accompanying drawings but which may be seen in full in our Letters Patent No. 818,807) is designated by the reference character $a$ and in it is journaled the main shaft $b$ which it will be understood is rotated continuously by means of a belt and pulley as illustrated in the Letters Patent referred to.

$c$ designates a gear wheel representing the part to be alternately driven and brought to a standstill and $d$ designates a pinion which is formed as a part of a sleeve $e$ and which intermeshes with said gear wheel, the sleeve being freely revoluble on shaft $b$, or rather on an anti-friction lining sleeve $f$ interposed between sleeve $e$ and said shaft. The pinion end of sleeve $e$ abuts against an eccentric $g$ which is keyed to the shaft and which in turn abuts against the frame $a$.

The end of shaft $b$ is formed with a squared portion $h$ and a reduced portion or extremity $i$, and on the squared portion is arranged a friction-disk $j$. To each face of this friction-disk, near the periphery thereof, is secured a wood ring $k$, whereby a good frictional contact between the disk and certain other parts to be described is derived, and in order to ventilate this portion of the friction-disk and thus prevent overheating the same while the frictional action is proceeding the friction-disk is formed with an annular series of ducts $l$ entering the same from its outer face and extending first from the points of entry in a direction opposite to that of the rotation of the friction-disk and then extending toward and discharging at the periphery of said friction-disk. (Figs. 1, 8, 10 and 11.)

Keyed on the outer portion of the sleeve $e$ is the collar $m$ of the hollow clutch-body $n$, the same comprising the disk-portion $o$ and cylindrical portion $p$. The disk-portion $o$ is annularly grooved on its outer face, as at $q$, to receive the rear or inner ring $k$, and the inner diameter of the cylindrical portion is such that some space $r$ is left between the inner surface thereof and the periphery of the friction-disk so that the cooling air entering the ducts $l$ may have access between the parts at this point and exhaust through the vent holes $s$.

$t$ designates a series of thrust-pins penetrating the cylindrical portion of the clutch-body parallel with its axis and lying against the inside face of its cylindrical portion; each of these has a shoulder $u$ on the inside at its outer end and its inner end threaded, it being free to move longitudinally in the clutch-body. On the threaded portion of each thrust-pin is a nut $v$ of pinion- or toothed form (see Fig. 9) and arranged in one of a series of recesses $w$ in the back of the clutch-body, which recesses communicate with a rabbeted groove $x$, also formed in the back of the clutch-body, in which is arranged a toothed ring $y$ which meshes with the several toothed nuts $v$ and is held in place by the retainer-ring $z$ which overlaps the toothed ring $y$ in a rabbet 1 formed therein and is secured to the clutch-body by the screws 2. The toothed ring $y$ is adapted to be adjusted rotatively by a spanner or other similar implement and for this purpose is provided with the spanner holes 3; in order to retain it where adjusted, spring-pressed friction plugs 4 are arranged back of it in recesses 5 in the back of the clutch-body (Figs. 10 and 14).

In the cylindrical portion of the clutch-body outside of the friction-disk is arranged the friction-ring 6, the same having the integral pairs of lugs 7 disposed on the outer face thereof near the periphery and so as to coincide with the thrust-pins $t$, the outer end of each of which stands between the lugs in each pair. A pin 8 is arranged in each pair of lugs, the same forming a fulcrum for a thrust-lever 9 having a hardened metal jaw 10 which is adapted to engage the shoulder $u$ of the corresponding thrust assuming device $t$; the friction-ring 6 may be recessed, as at 11, to permit free movement of the thrust-levers. The several thrust-levers are connected by links or toggles 12 with a thrust-cap 13 arranged on the reduced-portion $i$ of shaft $b$, a lining sleeve 14 being preferably interposed between said thrust-cap and the shaft. The thrust-cap is normally pressed outwardly by a spiral spring 15 seated in an axial recess 16 in the end of the shaft and abutting at one end against the end of said recess and at the other end against a shoulder 17 on a pin 18 which penetrates the cap axially and is secured in the cap by the clamping action of said shoulder and a nut 19 arranged on the protruding threaded end 20 of said pin. It will be observed that upon the cap 13 being pressed inwardly, the action of the toggles incident thereto is to turn the thrust-levers on their pivots which, upon bearing against the thrust-pins $t$, force the friction-ring inwardly and cause it to compress between it and the disk-portion of the clutch-body the friction-disk; when the pressure on the thrust-cap is relieved, the spring 15 returns the thrust-cap and toggles and thrust-levers to their initial positions, and in order at this time to move the friction-ring 6 out of contact with the friction disk spring-actuated plugs 21 are arranged in the clutch-body back of the friction-ring in recesses 22. It will be observed that on the initial contact of the friction-ring, friction-disk and disk-portion of the clutch-body when these parts are brought in clamping action with each other there will be a torsional strain on the friction ring tending to move it rotatively ahead of the clutch-body; the friction-ring is therefore peripherally grooved, as at 23, to receive the blocks 24 having studs 25 set in holes 26 in the cylindrical portion of the clutch-body.

27 is a strengthening steel band surrounding the outer portion of the clutch-body, which latter is preferably made of cast iron.

The clutch is brought into action so as to transmit power from the shaft $b$ to the gear-wheel $c$ and a checking action effected with respect to said gear-wheel as follows: A bracket 28 is bolted to the frame $a$ and in this bracket is fulcrumed the bell-crank lever 29 which carries at its free or outer end a set-screw 30 having a lock-nut 31, said set-screw being adapted to bear against the pin 18 when the lever is moved to throw the clutch into operation. This lever carries a block 32 in which is arranged a bearing piece 33 recessed at opposed points to receive the rounded ends of pins 34 which at their other ends (also rounded) seat in the bearing pieces 35 having threaded shanks which are screwed into the brake-levers 36 and held where adjusted by the lock-nuts 37; the brake-levers are drawn toward each other by the spiral spring 38 and their free ends are arranged one above and the other below the cylindrical portion of the clutch-body, being fulcrumed in the bracket 28. The brake-levers carry friction-blocks 39 adapted to bear against the periphery of the clutch-body. Thus, according as the lever 29 is moved, so it either throws the clutch into action or, through the brake-levers, applies a frictional braking action to the clutch-body, this latter action being the result of the pins 34 being forced by the lever 29 from a buckled disposition toward a more or less true alinement with each other. The spring 15 is stronger than the spring 38, so that the brake-levers normally frictionally engage the clutch-body and hold the same from the drag of the shaft $b$, while the clutch is held in its "open" or disestablished condition.

40 is a hand-lever for controlling the position of the lever 29 manually, the same being fulcrumed in the bracket 28 and having a depending portion 41 which is adapted to impinge against the back of a block 42 on lever 29 when the hand-lever is pulled outwardly. By manipulating this lever, the operator can cause the gear-wheel $c$ to be worked forwardly short distances at a time, as in adjusting the dies of the press, for instance.

On the eccentric $g$ is arranged an eccentric-strap 43 whose arm 44 carries a block 45 which is notched at 46 to receive the beveled edge 47 of the block 42 on lever 29 and which is supported in substantially a horizontal position by a pitman 48 which connects said arm with the treadle 49 fulcrumed in the base of the frame and normally held elevated by the spring 50. The action of the spring 50 is normally to hold the parts in such position that the block 45 stands in a plane slightly below that of the block 42, but upon depressing the treadle the arm 44 is raised and this brings the block 45 in the plane of block 42 so that, since the eccentric $g$ is reciprocating the arm substantially horizontally, the arm is caused to move lever 29, relieving the braking action on the clutch-body and throwing in the clutch. In order to automatically hold the lever 29 in the position to which it is thus moved a pivoted dog 51 is provided, the same being arranged on the bracket 28 above the arm 44 in such position as to be supported by the block 42 when the lever 29 is retracted but, when the block is withdrawn from beneath the same, to fall back of the same and thus lock the lever 29 against a return movement, being then supported by the block 45 of arm 44. In order to insure the movement of the dog to the locking position it may carry the spring-pressed plug 52 adapted to press against a part 53 of the frame when the dog is elevated. In manually controlling the operation of the gear-wheel $c$ by means of lever 40 it will be understood that it is not desired that the dog should act to lock the lever 29 in its acting position; the dog is therefore formed with an overhang 54 which is engaged by a pin 55 on the lever 40 when the latter is drawn outwardly, thus holding the dog out of locking relation to lever 29.

The automatic stopping of the gear-wheel $c$ and accessory mechanism may be accomplished by a roller 56 carried by the gear-wheel and adapted, once in every revolution of the latter, to wipe against a roller 57 on the dog 51 and trip the dog into its idle position should it at that time be depressed, locking the lever 29 in its acting position.

Having thus fully described our invention, what we claim as new and desire to secure by Letters Patent is:

1. In a clutch mechanism, the combination of a member to be rotated, a driving member comprising a friction-disk, said first-named member comprising parts between which the friction-disk is interposed and one of which forms a housing projecting beyond one side of the other and thus incloses said other part and the friction-disk and also comprising thrust-assuming devices projecting from the part forming the housing into said housing and beyond the friction-disk and said other part, said other part being movable axially to and from the friction-disk, thrust-levers pivoted in said other part within the housing and engaged with said thrust-assuming devices, and means for actuating the thrust-levers, substantially as described.

2. In a friction clutch, the combination of a member to be rotated, and a driving member frictionally engageable with the first member, the portion of said driving member engaged by the first member having penetrating ventilating openings extending radially and discharging at the periphery of said member and having their entrances extending oppositely to the direction of rotation of the driving member, substantially as described.

3. In a clutch mechanism, the combination of a member to be rotated, a driving member axially alined therewith, and means for effecting the movement of one of said members to and from the other comprising thrust-assuming devices having threaded portions, nuts arranged on the threaded portions of said thrust-assuming devices and means for effecting the simultaneous rotation of the nuts on the thrust-assuming devices, whereby to adjust said mechanism, substantially as described.

4. In a clutch mechanism, the combination of a member to be rotated, a driving member axially alined therewith and means for effecting the movement of one of said members to and from the other comprising thrust-assuming devices having threaded portions, peripherally toothed nuts arranged on the threaded portions of said thrust-assuming devices and each being revoluble in one of said members, and a toothed ring revoluble in said member and meshing with said toothed nuts, substantially as described.

5. The combination of a support, a rotated member, a driving member adapted to engage the rotated member, one of said members being movable into and out of power-transmitting engagement with the other member, a lever controlling the movable member, a lever-controlling part movable into an operative, and also into an inoperative, position relatively to said lever, means for actuating said lever-controlling part from the driving member, and means for moving said lever-controlling part from one to the other of its operative and inoperative positions, substantially as described.

6. The combination of a suitable support, a rotary member, a driving member adapted to engage the rotary member, one of said members being movable into and out of power-transmitting engagement with the other, spaced levers fulcrumed in said support on substantially parallel fulcrums, a part controlling the movable member and movable in a plane extending transversely of a line joining corresponding ends of the levers, means, comprising devices projecting in opposite directions from said part toward said levers, for transmitting power from said part to said levers, a moving actuating part actuated from the driving member, and means for moving said actuating part into position to engage said first-named part, substantially as described.

7. The combination of a support, a rotated member, a driving member adapted to engage the rotated member, one of said members being movable into and out of power-transmitting engagement with the other member, a lever controlling the movable member, an oscillating lever-controlling part movable into an operative, and also into an inoperative, position relatively to said lever, means for oscillating said lever-controlling part from the driving member, and means for moving said lever-controlling part from one to the other of its operative and inoperative positions, substantially as described.

8. The combination of a suitable support, a rotated member, a driving member adapted to engage the rotated member, one of said members being movable into and out of power transmitting engagement with the other, a lever controlling the movable member, a moving actuating part actuated from the driving member, means for moving said actuating part into position to engage said lever, and means for locking said lever in the position to which it is moved by the actuating part, substantially as described.

9. The combination of a support, a rotated member, a driving member, means for causing the rotated member to be driven from the driving member, a moving part controlling said means and movable into an operative, and also into an inoperative, relation to said means, means for transmitting movement from the driving member to said part, and means for moving said part from one to the other of its operative and inoperative positions, substantially as described.

10. The combination of a suitable support, a rotated member, a driving member, means for causing the rotated member to be driven from the driving member, a moving actuating part actuated from the driving member and movable into and out of position to engage said means, and means for automatically locking the first-named means in the position to which it is moved by said actuating part, substantially as described.

11. The combination of a suitable support, a part to be rotated, means for controlling the rotation of said part, a moving actuating part movable into position to engage said means, and means for automatically locking said means in the position to which it is moved by said actuating part, said first-named part being engageable with said locking means to cause the same to unlock the controlling means, substantially as described.

In testimony, that we claim the foregoing, we have hereunto set our hands this 22" day of June 1908.

BENJAMIN ADRIANCE.
AMOS CALLESON.

Witnesses:
W. J. HORN;
JAMES VAN WICKLEN.